US010020761B2

(12) United States Patent
Wang et al.

(10) Patent No.: US 10,020,761 B2
(45) Date of Patent: Jul. 10, 2018

(54) ELECTRIC MOTOR POSITION SIGNAL SYNCHRONIZED OPERATION

(71) Applicant: FORD GLOBAL TECHNOLOGIES, LLC, Dearborn, MI (US)

(72) Inventors: Chang-Jiang Wang, Troy, MI (US); Michael W. Degner, Novi, MI (US); William Reynolds, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/623,425

(22) Filed: Sep. 20, 2012

(65) Prior Publication Data

US 2014/0077739 A1      Mar. 20, 2014

(51) Int. Cl.
*H02K 29/12* (2006.01)
*H02P 6/16* (2016.01)
(Continued)

(52) U.S. Cl.
CPC .............. *H02P 6/16* (2013.01); *B60L 11/123* (2013.01); *B60L 11/14* (2013.01); *B60L 15/2054* (2013.01); *B60L 2210/10* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/461* (2013.01); *B60L 2240/80* (2013.01); *B60L 2250/26* (2013.01); *H02P 2209/13* (2013.01); *Y02T 10/6217* (2013.01); *Y02T 10/644* (2013.01); *Y02T 10/645* (2013.01); *Y02T 10/7077* (2013.01);
(Continued)

(58) Field of Classification Search
USPC ............... 318/400.37, 400.38, 400.39, 432
See application file for complete search history.

(56) References Cited

U.S. PATENT DOCUMENTS 3,781,616 A * 12/1973 Mokrytzki et al. ........... 318/801
5,449,986 A *  9/1995 Dozor ...................... H02P 6/06
                                                    318/400.04
(Continued)

OTHER PUBLICATIONS

Bolognani et al.; Novel Digital Continuous Control of SVM Inverters in the Overmodulation Range; IEEE Transactions on Industry Applications, vol. 33, No. 2, Mar./Apr. 1997; 6 pages.
(Continued)

*Primary Examiner* — Erick Glass
(74) *Attorney, Agent, or Firm* — David B. Kelley; Brooks Kushman P.C.

(57) ABSTRACT

An embedded controller in a vehicle electronics subsystem includes a signal processing circuit used to communicate with an electric machine. The signal processing circuit may be configured to receive an input signal from the electric machine and provide digital output signals to the embedded controller. The digital output signals may include Hall position and rotor position signals. Once the digital output signals are processed by a processor embedded within the controller, the processor may issue a control command to the electric machine. The processor may have memory containing software to make the processor execute the computation of the control command of the electric machine in accordance with a torque command.

3 Claims, 6 Drawing Sheets (51) Int. Cl.
*B60L 11/12* (2006.01)
*B60L 11/14* (2006.01)
*B60L 15/20* (2006.01)

(52) U.S. Cl.
CPC ........ *Y02T 10/7216* (2013.01); *Y02T 10/7241* (2013.01); *Y02T 10/7275* (2013.01); *Y02T 90/16* (2013.01)

(56) References Cited

U.S. PATENT DOCUMENTS

| | | | |
|---|---|---|---|
| 5,552,977 | A | 9/1996 | Xu et al. |
| 5,739,064 | A * | 4/1998 | Hu et al. .................. 438/528 |
| 6,005,783 | A * | 12/1999 | Xue .................. H02M 7/529 363/36 |
| 6,388,419 | B1 | 5/2002 | Chen et al. |
| 7,189,530 | B2 * | 3/2007 | Botstein et al. ............ 435/69.1 |
| 7,268,710 | B1 | 9/2007 | Liu et al. |
| 7,271,557 | B2 * | 9/2007 | Ajima et al. ............ 318/400.01 |
| 8,253,360 | B2 * | 8/2012 | Schulz et al. ............ 318/400.02 |
| 2007/0182110 | A1 * | 8/2007 | Urababa .................. 280/5.508 |
| 2009/0028532 | A1 * | 1/2009 | El-Antably et al. .......... 388/819 |
| 2011/0062908 | A1 * | 3/2011 | Kitanaka ................ 318/400.22 |
| 2011/0121768 | A1 | 5/2011 | Ting et al. |

OTHER PUBLICATIONS

Bose; A High-Performance inverter-Fed Drive System of an Interior Permanent Magnet Synchronous Machine; IEEE Transactions on Industry Applications, vol. 24, No. 6, Nov./Dec. 1988; 11 pages.

Gupta et al.; A General Space Vector PWM Algorithm for Multilevel Inverters, Including Operation in Overmodulation Range; IEEE Transactions on Power Electronics, vol. 22, No. 2, Mar. 2007; 10 pages.

Holtz et al.; On Continuous Control of PWM Inverters in the Overmodulation Range Including the Six-Step Mode; IEEE Transactions on Power Electronics, vol. 8, No. 4 , Oct. 1993; 8 pages.

Holtz et al.; On Continuous Control of PWM Inverters in the Overmodulation Range Including the Six-Step Mode; IEEE T0-7803-0582-5 /92$3.0001992 ; 6 pages.

Monajemy et al.; Performance Comparison for Six-Step Voltage and Constant Back EMF Control Strategies for PMSM; IEEE 0-7S03-S5S9-x199/$10.00 0 1999—8 pages.

Nakai et al.; Development and Testing of the Torque Control for the Permanent-Magnet Synchronous Motor; IEEE 0/7803-7108-9/01/ $10.00 (C)2001; 6 pages.

Tripathi et al., Stator Flux Based Space-Vector Modulation and Closed Loop Control of the Stator Flux Vector in Overmodulation Into Six-Step Mode; IEEE Transactions on Power Electronics, vol. 19, No. 3, May 2004; 8 pages.

* cited by examiner

ELECTRIC MOTOR POSITION SIGNAL SYNCHRONIZED OPERATION

TECHNICAL FIELD

This disclosure relates to control of electric motors.

BACKGROUND

Permanent magnet synchronous motors (PMSMs) are utilized in various applications because they have generally favorable efficiency characteristics relative to other types of motors. Typically, PMSMs have three separate electrical windings within the stator that are powered by an alternating current (AC) voltage source. The shaft torque of the motor and the power conversion efficiency depend upon both the magnitude and the phase angle of the AC voltage.

In certain applications, such as electric vehicles and hybrid electric vehicles, electrical power is available from a direct current (DC) voltage source such as a battery. Therefore, inverters are utilized to convert the DC voltage into the three-phase AC voltage. Inverters contain a discrete number of switching devices and are therefore capable of supplying only a discrete number of voltage levels at each of the three motor terminals. For a 2-level inverter, at any moment in time, the switching devices are set to electrically connect each of the three AC terminals to either the positive or the negative DC terminal. Thus, eight switching states are available. Two of these switching states, in which all three terminals are connected to the same DC terminal, are called zero states. In the remaining six states, one AC terminal is connected to one of the DC bus terminals and the other two AC terminals are connected to the opposite DC bus terminal.

In one basic control method, called six-step, the inverter cycles through the six non-zero states once per electrical cycle of the rotor, producing AC voltage and current in the windings. An electrical rotor cycle is defined relative to motor poles and does not necessarily correspond to a complete revolution. The amplitude of the AC voltage is dictated by the DC voltage. The torque is dictated by the DC voltage, the rotor speed, and the phase difference between these quasi-sinusoidal AC voltage signals and the rotor position. A controller issues commands, called gate control commands, indicating to the inverter when to switch to the next state in the sequence. Accurate torque control requires precise timing of these inverter gate control commands.

SUMMARY

A vehicle includes an electric machine with at least one controller that outputs a gate control signal to an inverter. The at least one controller may command a gate control signal based on Hall position and rotor position information from the electric machine. Based on the Hall position and rotor position, the inverter outputs a voltage to the electric machine with a phase in accordance with a torque command.

An embedded controller in a vehicle electronics subsystem includes a signal processing circuit used to communicate with an electric machine. The signal processing circuit may receive an resolver-to-digital input signal from the electric machine and provide digital output signals to the embedded controller. The digital output signals may include Hall position and rotor position signals. Once the digital output signals are processed by a processor within the embedded controller, the processor may issue a control command to the electric machine. The processor may have memory containing software to make the processor execute the computation of the control command of the electric machine in accordance with a torque command.

A method is used to controls an electric machine by responding to a resolver-to-digital module input signal transmitted to a processor. The processor may issue gate control commands based on Hall position and rotor position information being transmitted by the resolver-to-digital module. Once the processor issues the gate control commands, an inverter outputs a voltage to the electric machine with a phase in accordance with a torque command.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
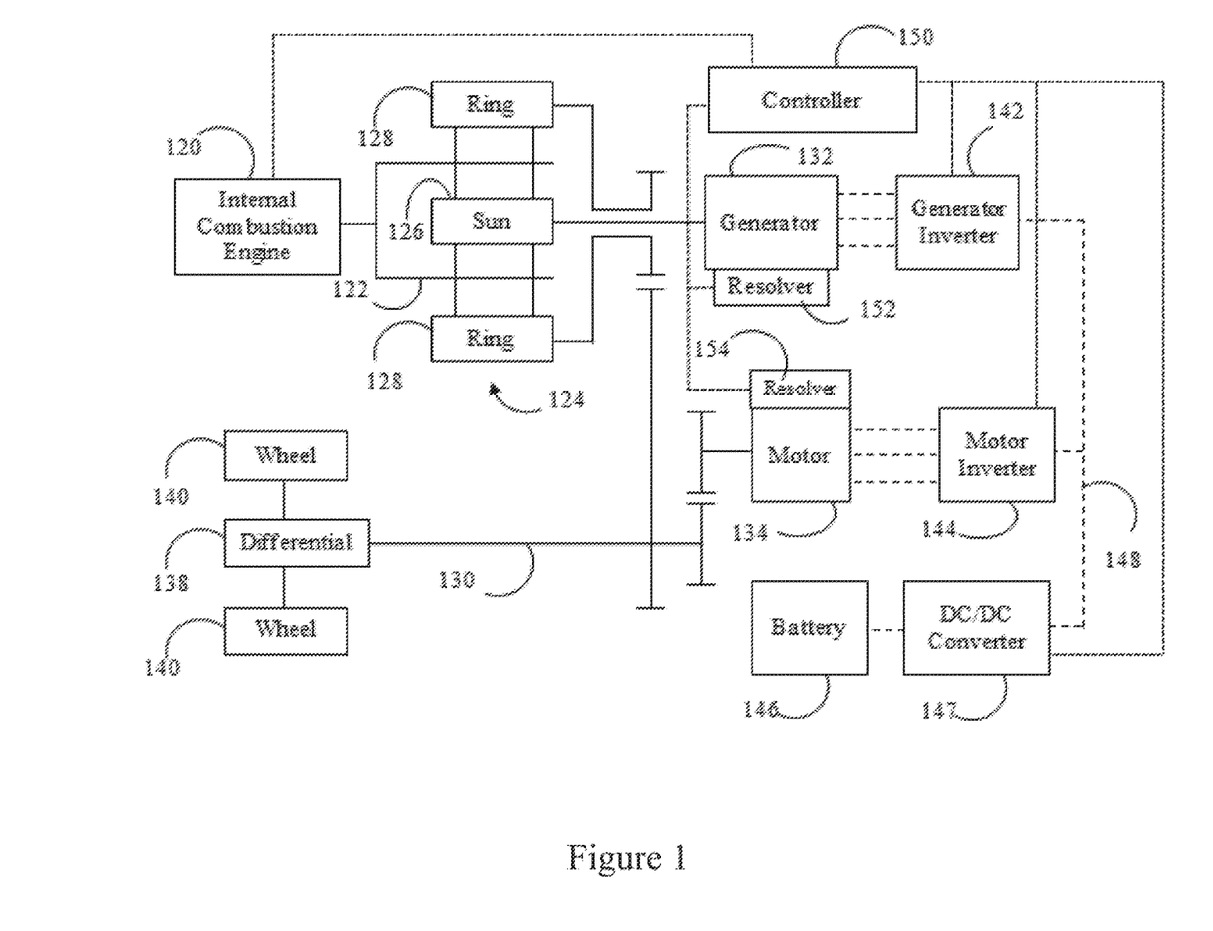
FIG. 1 is a schematic diagram of an exemplary hybrid electric powertrain.

A schematic diagram of an exemplary hybrid electric powertrain is illustrated in FIG. 1. However, the claimed invention is not limited to this powertrain topology. Internal combustion engine 120 drives carrier 122 of planetary gear set 124. The engine torque is divided by gear set 124 between sun gear 126 and ring gear 128. The ring gear torque is transmitted mechanically to output shaft 130. The sun gear torque is absorbed by generator 132. Motor 134 is driveably connected to output shaft 130. Throughout this description, the terms generator and motor are used merely as labels to identify these components. Both generator 132 and motor 134 are reversible electrical machines capable of both converting mechanical shaft power into electrical power and converting electrical power into mechanical shaft power. For convenience, a control method will be discussed with respect to motor 134 although it also applies to generator 132.

The driveshaft is driveably connected to a differential which divides the power between left and right wheels 140 while allowing slight differences in wheel speeds. Electrical power connections are illustrated by dashed lines with long dashes. Generator 132 and motor 134 are electrically powered by inverters 142 and 144 respectively via three phase power circuits. Inverters 142 and 144 draw power from or supply power to DC electrical bus 148. Electrical power is stored in battery 146. DC to DC Converter 147 converts the voltage level of battery 146 to the voltage level of DC bus 148. The DC bus voltage may be either higher or lower than the battery voltage. Control signal connections are illustrated by dashed lines with short dashes. Controller 150 issues control signals to DC to DC converter 147 specifying the desired voltage for the DC electrical bus 148. Controller 150 also issues control commands to engine 120 and inverters 142 and 144 to regulate the torque generated by the engine, generator 132, and motor 134 respectively. Resolvers 152 and 154 sense the position of the generator shaft and motor shaft respectively and send analog signals to controller 150. If the torque actually delivered by motor 134 differs significantly from the requested torque, then vehicle acceleration will not match the driver's expectation. If the torque actually delivered by generator 132 differs significantly from the requested torque, then engine speed will depart from expected behavior.

Figure 2:
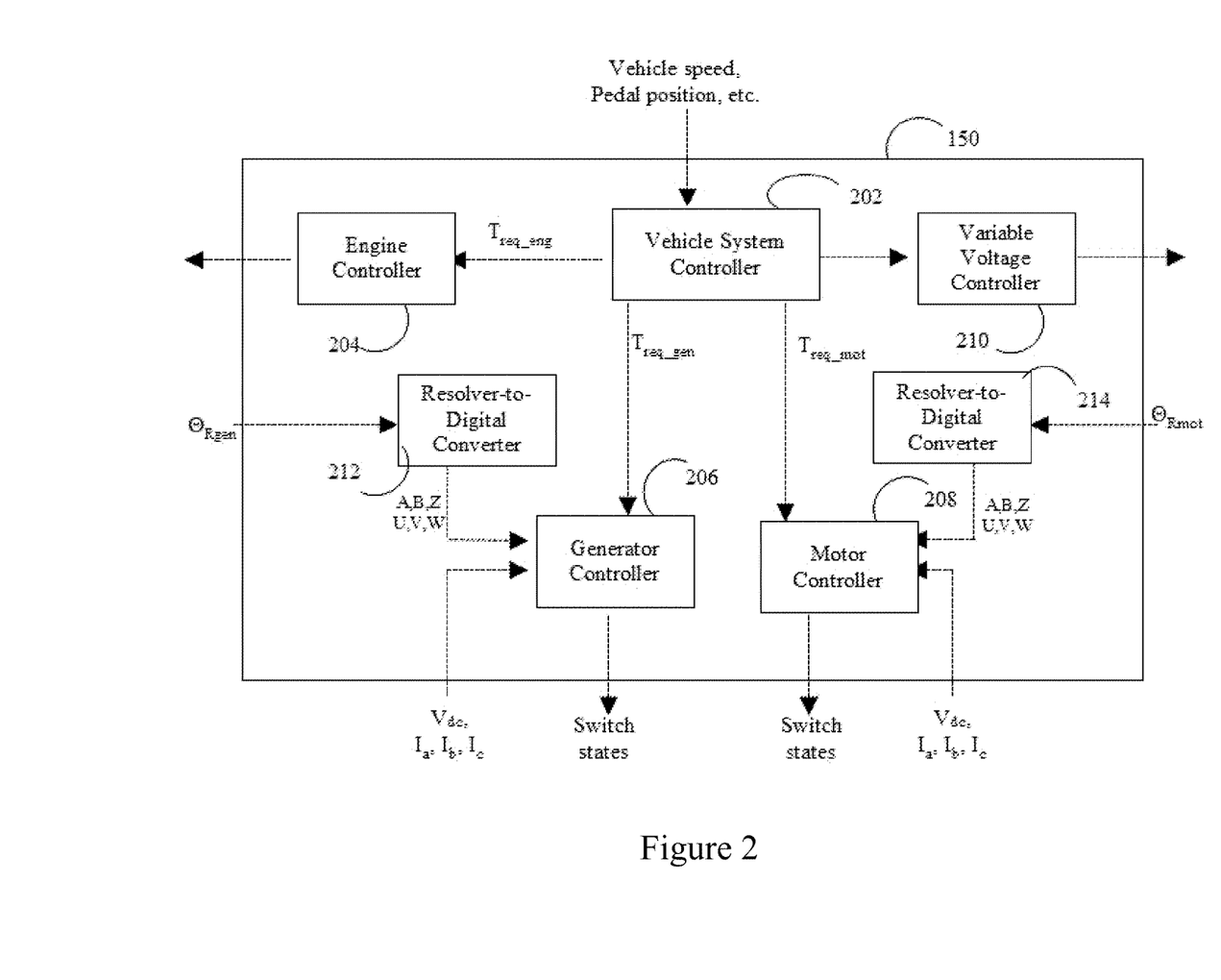
FIG. 2 is a controller schematic in an exemplary hybrid electric powertrain.

Controller 150 is illustrated schematically in more detail in FIG. 2. Vehicle system controller 202 receives signals indicating vehicle speed, position of the accelerator pedal and brake pedal, position of the electric machine rotor, and various other vehicle data. Based on this data, the vehicle system controller determines a target DC bus voltage and a target output shaft torque and issues torque requests $T_{req\_eng}$ to engine controller 204, $T_{req\_gen}$ to generator controller 206, and $T_{req\_mot}$ to motor controller 208. The output of generator controller 206 and motor controller 208 are gate control commands to inverters 142 and 144 respectively. Resolvers 152 and 154 may communicate rotor position with a resolver-to-digital converter 212 and 214 respectively by transmitting analog signals. Resolver-to-digital converters 212 and 214 translate these analog signals into digital output signals A, B, Z, U, V, and W to controllers 206 and 208 respectively. The controllers receive additional input signals indicating the voltage of DC bus 148, labeled $V_{dc}$, and the current in each winding, labeled $I_a$, $I_b$, and $I_c$. Variable Voltage Controller 210 issues commands to DC to DC converter 147 to effectuate the target bus voltage. Controllers 202, 204, 206, 208, and 210 may be implemented as a single micro-controller or as multiple communicating controllers. The resolver-to-digital converter module may be embedded on any of the electric machine controllers including, but not limited to, a vehicle electronics embedded controller used with hybrid vehicles.

One or both of generator 132 and motor 134 may be permanent magnet synchronous motors (PMSMs). For a PMSM, winding voltages $V_a$, $V_b$, and $V_c$ each oscillate at a frequency proportional to the rotor speed and separated by 120 degrees in phase from one another. Similarly, the resulting winding currents $I_a$, $I_b$, and $I_c$ each oscillate at a frequency proportional to the rotor speed and separated by 120 degrees in phase from one another. These winding currents induce a rotating magnetic field in the motor which may be out of phase with the rotor. The resulting shaft torque depends upon both the magnitude of the magnetic field and the phase angle relative to the rotor.

Figure 3:
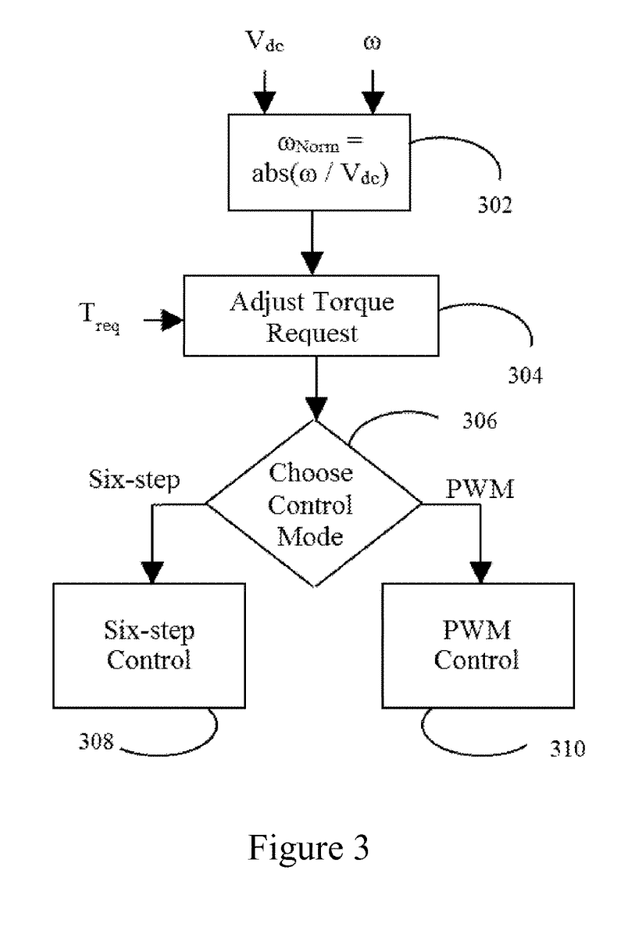
FIG. 3 is a flow chart for a control algorithm for permanent magnet synchronous motors.

FIG. 3 illustrates computations that may be performed at regular intervals by controllers 206 and 208. At 302, the controller computes a normalized speed, $\omega_{Norm}$, by dividing the rotor speed by the bus voltage. At 304, the controller adjusts the torque request from the vehicle system controller if necessary to ensure that the requested torque is within the motor operating region for the current rotor speed and bus voltage. At 306, the controller selects between PWM and six-step control methods based on the adjusted torque request and the normalized speed. If the six-step mode is selected, the controller computes inverter commands at 308 based on the six-step method. If the PWM mode is selected, the controller computes inverter commands at 310 based on the PWM method.

In six-step control, torque is adjusted by adjusting the rotor position at which the gate control commands are issued. Therefore, it is imperative that the controller be synchronized with the rotor such that the code which changes the inverter gate control command execute at the desired time. This may be accomplished through the use of interrupts which cause particular routines to execute in response to particular events such as a change in state of a digital signal. These interrupts may be triggered by the digital signals from the resolver-to-digital converter.

Figure 4:
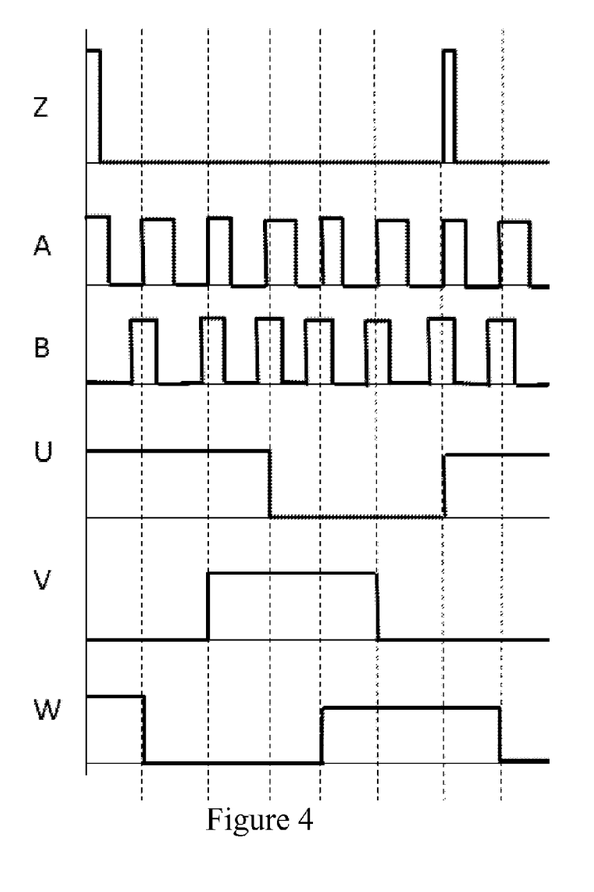
FIG. 4 is a graphical representation of rotor position signals in combination with Hall effect signals used to determine rotor position.

FIG. 4 is a graphical representation of the digital signals provided by the resolver-to-digital converter as a function of rotor position. Signal Z provides a short pulse each time the rotor passes a zero degree position. The A and B signals alternate between zero and one based on rotor position. By counting the number of times that the A and B signals change after a pulse of the Z signal, a controller can determine the rotor position within a small range. The A and B signals are offset such that the controller can determine which direction the rotor is turning. Hall position signals U, V, and W are set to zero for half of each cycle and set to one for the other half of the cycle. The Hall position signals are offset from one another such that one of the three signals changes every 60 degrees of rotation. The Hall position signals may be generated by Hall effect sensors. Using the rotor position signals in combination with the Hall position signals may generate six synchronization signals per electric revolution of the rotor instead of just one based on the rotor position signal Z. With the use of six signals, the control of the PMSM may have less time for error build up when determining rotor position to calculate torque angle for delivery of the requested torque.

Figure 5:
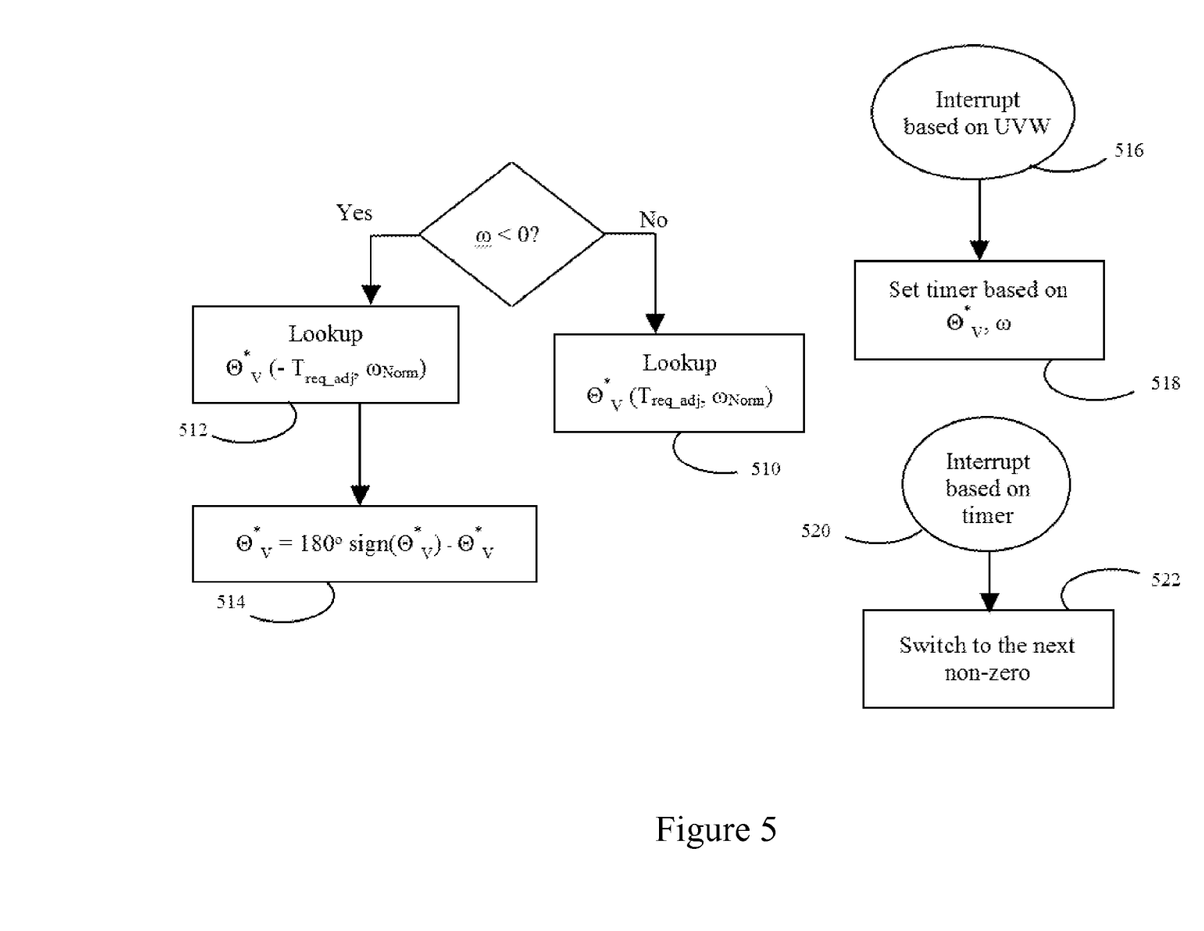
FIG. 5 is an example of an algorithm for computing voltage angle.

FIG. 5 illustrates a control algorithm using A, B, Z and U, V, W signals to adjust PMSM torque using six-step control. PMSM torque is determined by the voltage angle, $\Theta_V$. The controller adjusts voltage angle $\Theta_V$ by adjusting the timing at which it switches the inverter to the next non-zero inverter state. The target voltage angle $\Theta^*_V$ is based on a table with two parameters, the adjusted torque request and the normalized speed, $\omega_{Norm}$. This table is populated during calibration based on testing to characterize the motor.

For positive rotor speeds, the target voltage angle is determined at 510 with a single table lookup. For negative rotor speeds, the controller relies on the symmetry of motor behavior by looking up a target voltage angle for a corresponding positive speed operating point at 512 and adjusting it for the negative speed operating point at 514. Due to the critical timing of the state switching, the switching is performed by functions that respond to interrupts. A first interrupt occurs at 516 whenever the U, V, or W signals change state. At 518, an interrupt handler computes the time at which the state change should occur based on voltage angle $\Theta^*_V$ and the rotor speed w and sets a timer. A second interrupt occurs at 520 when this timer expires. At 522, an interrupt handler issues a command to the inverter to switch to the next non-zero state.

Figure 6:
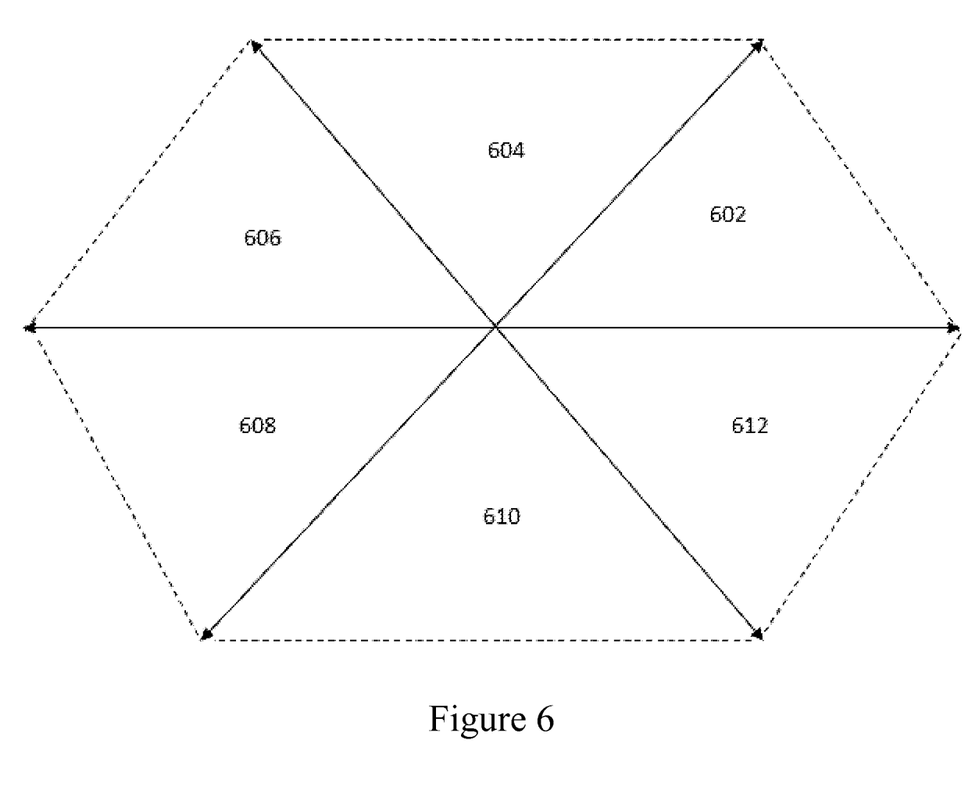
FIG. 6 illustrates voltage vector sections illustrating the six synchronization positions to identify rotor position.

FIG. 6 illustrates voltage vector sections identifying the process for angles in the six sections when the rotor rotates during six step control operation of the PMSM. Using the rotor position in combination with Hall effect signals may result in six synchronization positions to identify rotor position. The timing method having rotor position signals in combination with Hall effect signals provide six synchronization positions measured, improving initiating of an interrupt handler 516 used to compute the timer at which the state change should occur. If the rotor position Z signal was only used during six step control operation, the rotor position may be read only in one of the voltage vector sections. For example, the rotor position Z signal may pulse every time the rotor crosses 1002. Once the Z signal pulses, the interrupt based on voltage angle 516 sets the interrupt timer 518 thus initiating when the state change should occur. With the implementation of rotor position signals in combination with the Hall effect signals, the rotor position may be read in six voltage vectors 602, 604, 606, 608, 610, and 612. Having the rotor position read at six voltage vectors allows the interrupt handler 516 to set the correct timer at which the state change should occur. The rotor position being synchronized six times may allow for a more accurate timer calculation which in turn will increase PMSM efficiency and deliver an accurate requested torque.

Either the rotor position ABZ signals or the Hall effect UVW signals can be used for synchronization purposes. The combination of using both rotor position signals and Hall effect signals may result in better control performance compared to using them separately. Using the combination of both signals during six step operation may facilitate precise initiating of interrupt timers resulting in accurate timing of inverter state switching. The six step operation with the use of rotor position and Hall effect signals may improve PMSM efficiency and deliver an accurate torque requested value.

The processes, methods, or algorithms disclosed herein can be deliverable to/implemented by a processing device, controller, or computer, which can include any existing programmable electronic control unit or dedicated electronic control unit, such as the controller 12. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a resolver-to-digital converter configured to receive analog signals as rotor position and to output digital signals as rotor position ABZ signals and Hall effect UVW signals representing rotor positions of an electric motor corresponding to six voltage vectors, wherein a combination of rotor position ABZ signals and Hall effect UVW signals generate six synchronization signals per electric revolution of a rotor; and
a controller configured to reduce error build up by adjusting interrupt timing calculated from the rotor position ABZ and Hall effect UVW signals and associated with an inverter state switching during a six step control of the electric motor, wherein each interrupt timing alters a voltage angle, and thus torque, of the electric motor.

2. The vehicle of claim 1, wherein the electric motor is a permanent magnet synchronous motor.

3. A method comprising:
receiving analog signals as rotor position;
outputting digital signals as rotor position ABZ signals and Hall effect UVW signals representing rotor positions of an electric motor corresponding to six voltage vectors, wherein a combination of rotor position ABZ signals and Hall effect UVW signals generate six synchronization signals per electric revolution of a rotor; and
reducing error build up by adjusting interrupt timing calculated from the rotor position ABZ and Hall effect UVW signals and associated with an inverter state switching during a six step control of the electric motor, wherein each interrupt timing alters a voltage angle, and thus torque, of the electric motor.

* * * * *